(12) United States Patent
Mizumoto

(10) Patent No.: US 9,540,197 B2
(45) Date of Patent: Jan. 10, 2017

(54) PAPER-SHEET HANDLING SYSTEM AND PAPER-SHEET HANDLING METHOD

(71) Applicant: GLORY LTD., Himeji-shi, Hyogo-ken (JP)

(72) Inventor: Koji Mizumoto, Himeji (JP)

(73) Assignee: GLORY LTD., Himeji-shi, Hyogo-ken (JP)

( * ) Notice: Subject to any disclaimer, the term of this patent is extended or adjusted under 35 U.S.C. 154(b) by 162 days.

(21) Appl. No.: 14/287,544

(22) Filed: May 27, 2014

(65) Prior Publication Data

US 2014/0351737 A1    Nov. 27, 2014

(30) Foreign Application Priority Data

May 27, 2013    (JP) ................................. 2013-110722

(51) Int. Cl.
| | | |
|---|---|---|
| *G06F 15/00* | (2006.01) | |
| *G06K 1/00* | (2006.01) | |
| *G06K 15/00* | (2006.01) | |
| *B65H 7/20* | (2006.01) | |
| *G06F 3/0484* | (2013.01) | |
| *G07D 11/00* | (2006.01) | |

(52) U.S. Cl.
CPC ............... *B65H 7/20* (2013.01); *G06F 3/0484* (2013.01); *G07D 11/0048* (2013.01); *G07D 11/0063* (2013.01); *G07D 11/0081* (2013.01)

(58) Field of Classification Search
CPC ............... G06F 3/0484; G07D 11/0048; G07D 11/0063; G07D 11/0081; B65H 7/20

USPC ........................................ 358/1.1, 1.13, 1.12
See application file for complete search history.

(56) References Cited

U.S. PATENT DOCUMENTS

| | | |
|---|---|---|
| 4,694,963 A | 9/1987 | Takesako |
| 4,905,840 A | 3/1990 | Yuge et al. |
| 7,316,349 B2 | 1/2008 | Shepley et al. |
| 8,135,299 B2 * | 3/2012 | Peters et al. ................... 399/81 |
| 8,833,661 B2 * | 9/2014 | Terwilliger et al. ...... 235/462.45 |
| 8,937,740 B2 * | 1/2015 | Sakata ............... G06K 15/4065 358/1.15 |
| 2005/0269397 A1 | 12/2005 | Shepley et al. |

FOREIGN PATENT DOCUMENTS

| | | |
|---|---|---|
| CN | 1971637 | 5/2007 |
| EP | 1 788 532 A2 | 5/2007 |
| EP | 2 474 953 A1 | 7/2012 |

(Continued)

OTHER PUBLICATIONS

European Search Report (Application No. 14169667.4) (7 pages—dated Sep. 14, 2011).

(Continued)

*Primary Examiner* — Douglas Tran
(74) *Attorney, Agent, or Firm* — Renner, Kenner, Greive, Bobak, Taylor & Weber

(57) ABSTRACT

A paper-sheet handling system includes a plurality of paper-sheet handling units each configured to handle a paper sheet. The paper-sheet handling system includes a display unit configured to display information related to one or more paper-sheet handling unit/units. When the display unit displays a part of a plurality of the paper-sheet handling units, the display unit displays the information related to the paper-sheet handling unit/units per each unit.

7 Claims, 8 Drawing Sheets

(56) References Cited

FOREIGN PATENT DOCUMENTS

| JP | 2004-258881 A | 9/2004 |
| WO | WO 2008/044279 A1 | 4/2008 |
| WO | WO 2010/097954 A1 | 9/2010 |

OTHER PUBLICATIONS

Chinese Office Action with English translation (Application No. 2014102282657) (12 pages dated Dec. 25, 2015).
Japanese Office Action with English translation (Application No. 2013-110722) (6 pages dated Nov. 18, 2016).

* cited by examiner

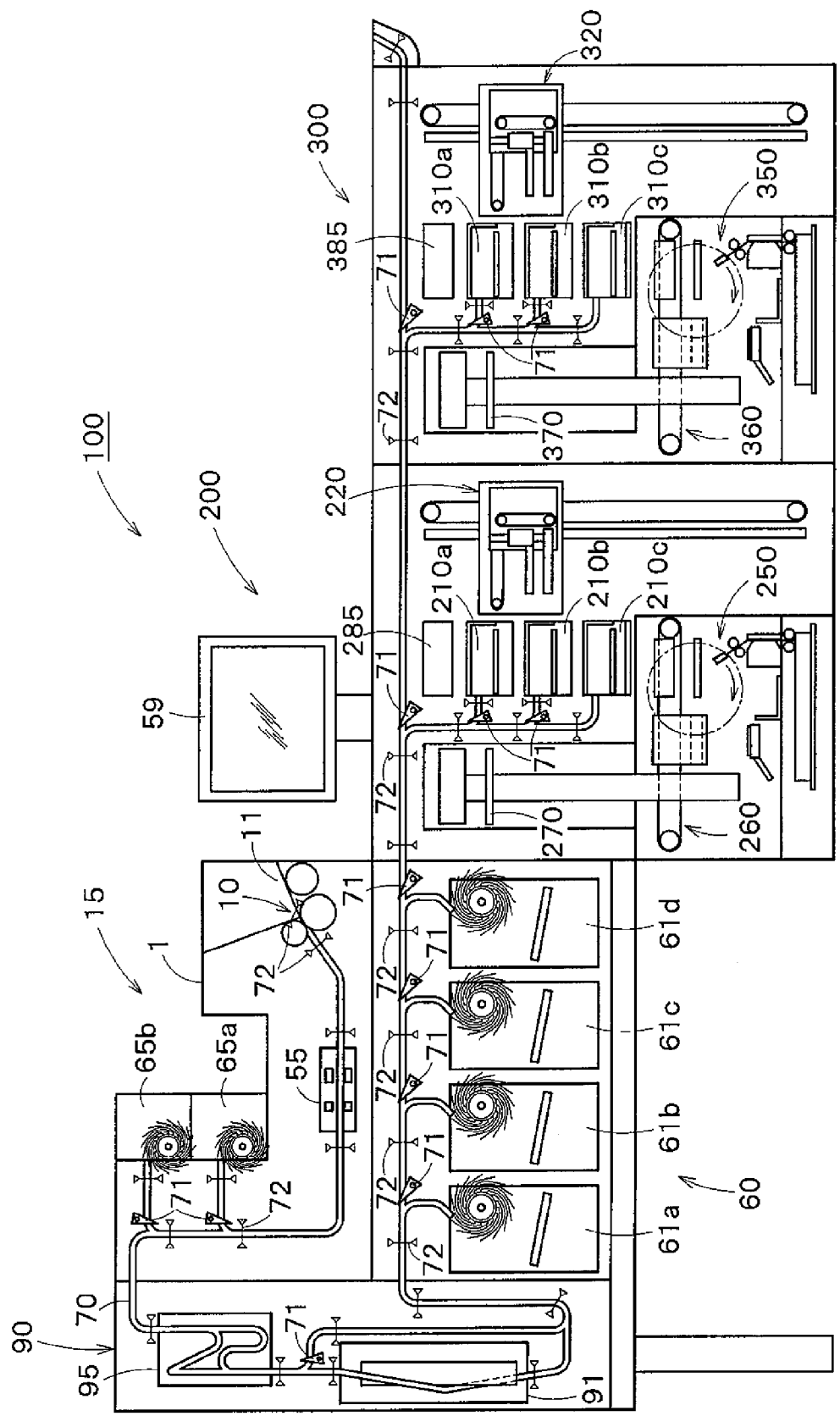
F I G. 1

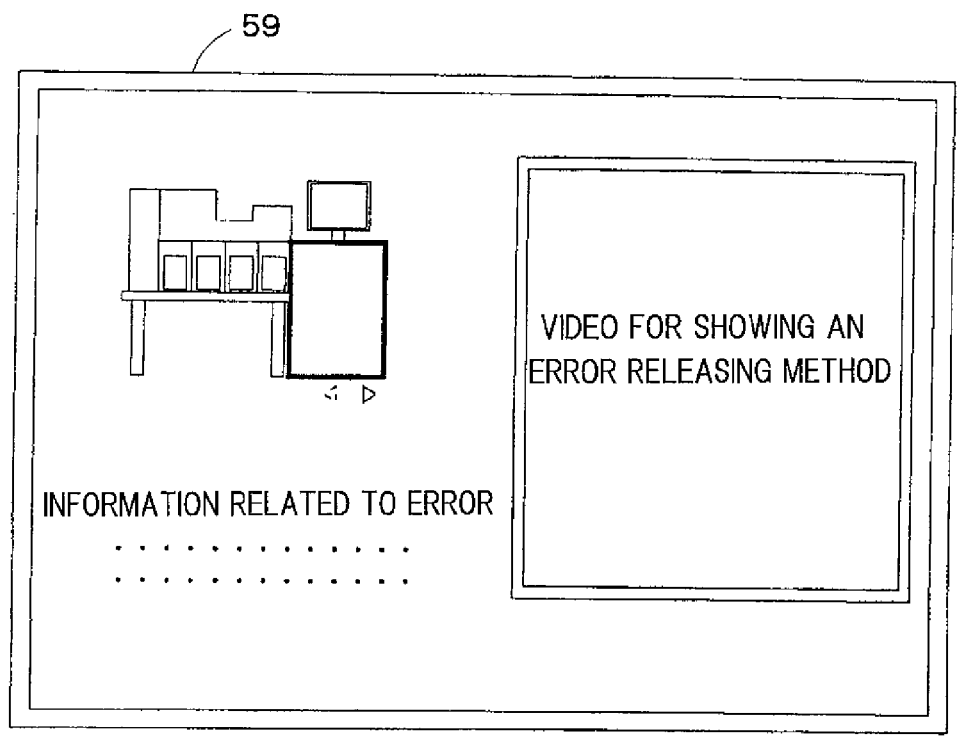
F I G. 2
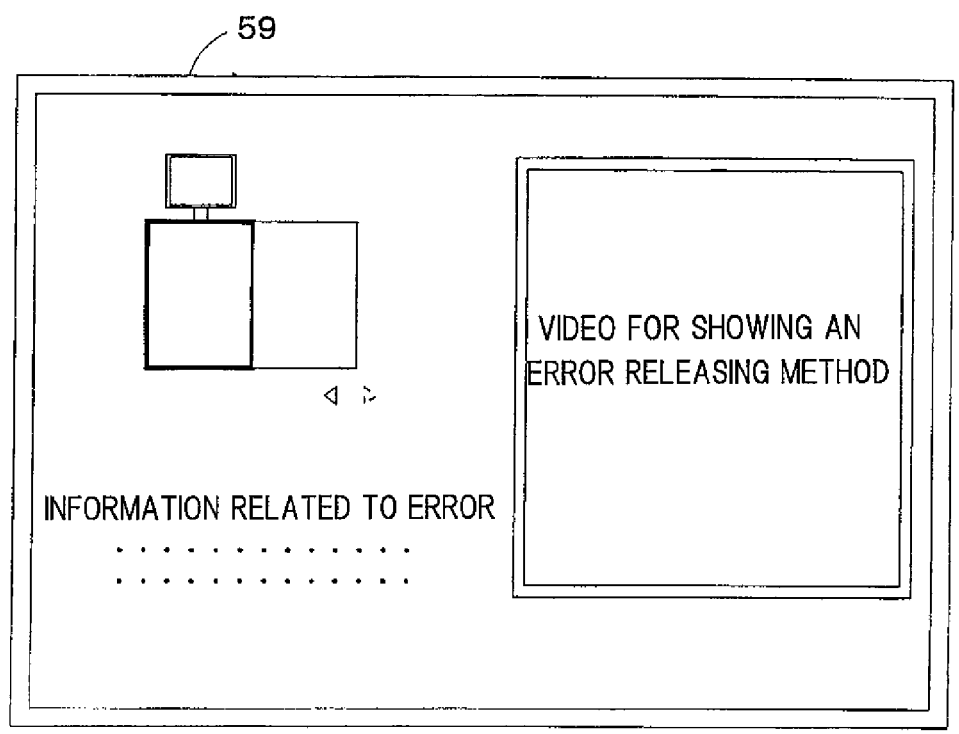
F I G. 3

FIG. 4

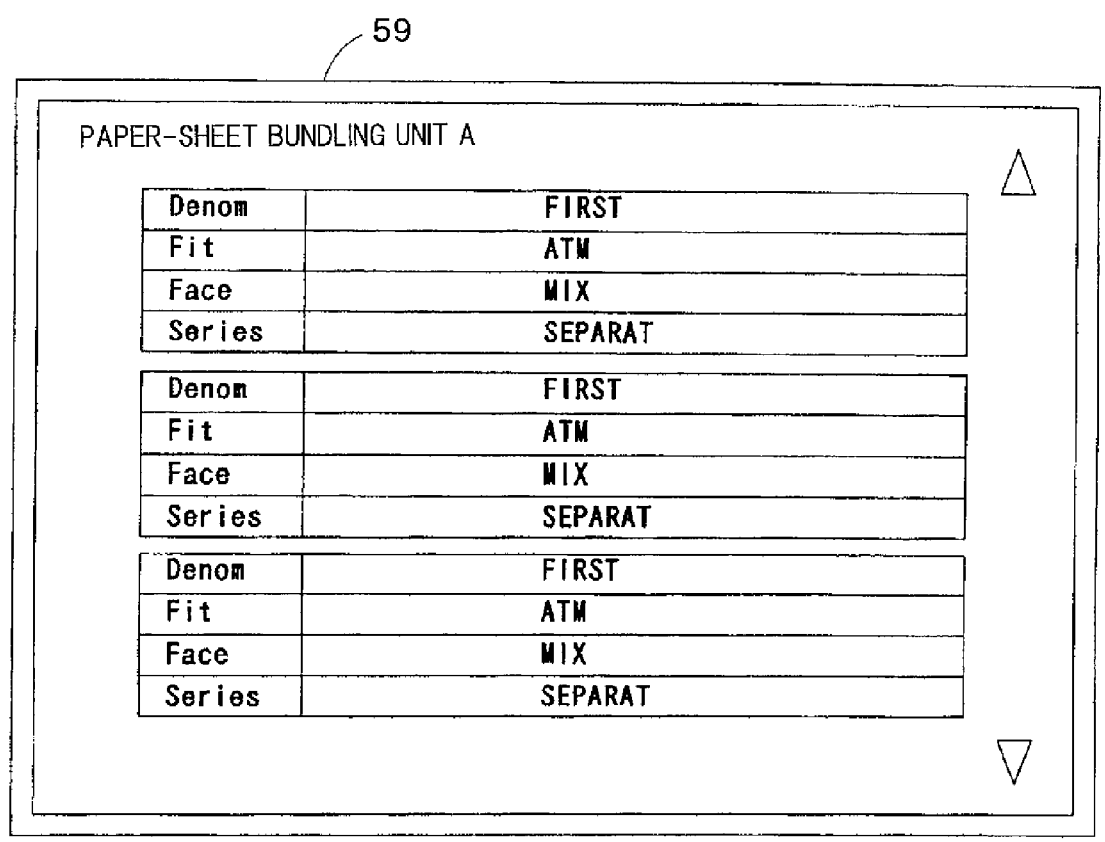
F I G. 5

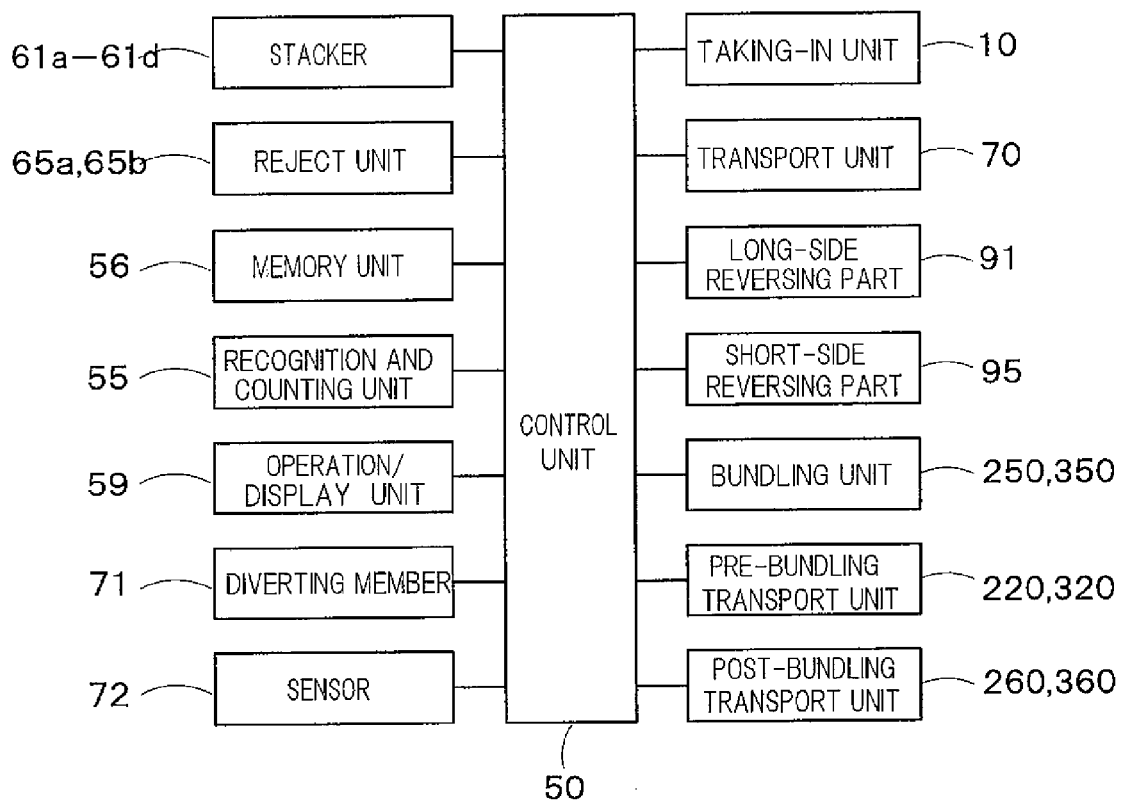
F I G. 6

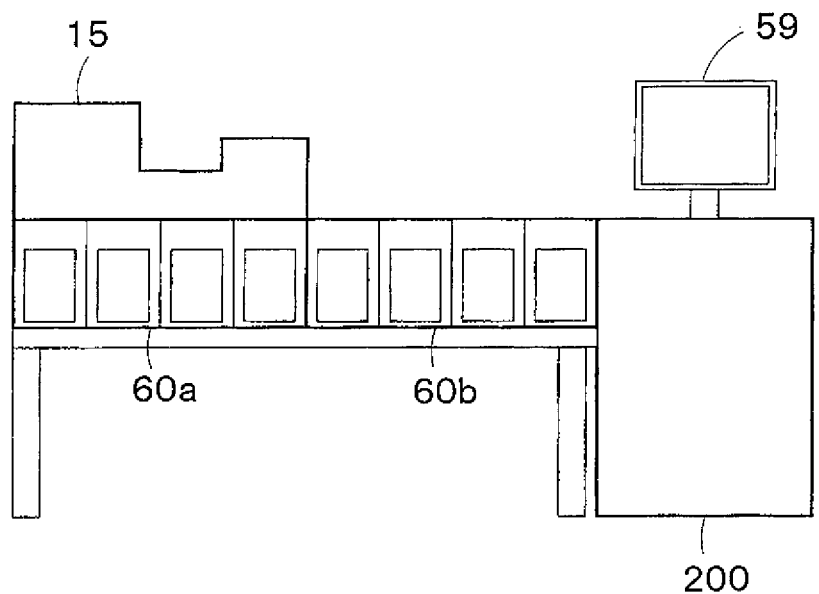
F I G. 7
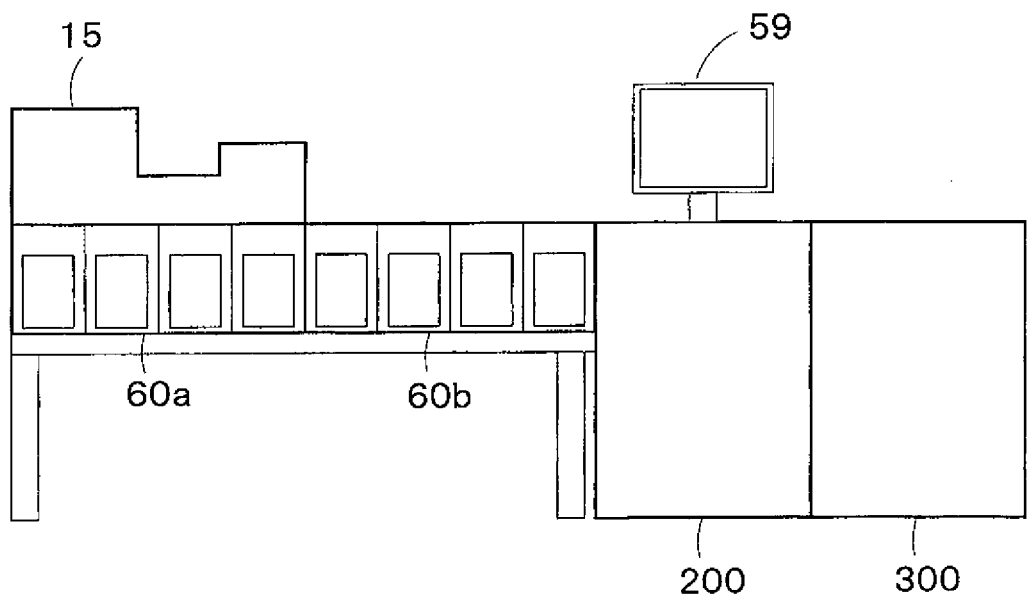
F I G. 8

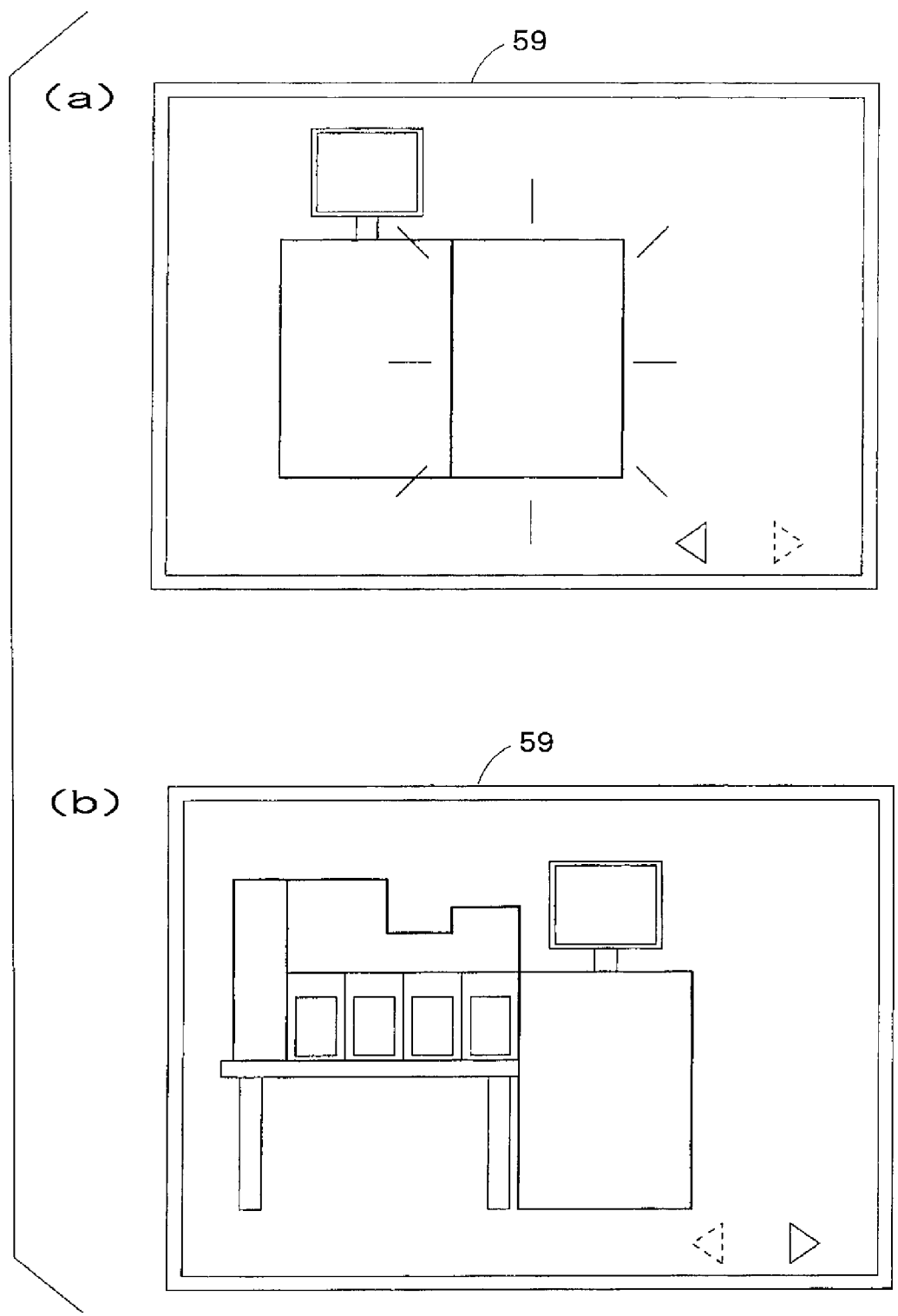
F I G. 11

PAPER-SHEET HANDLING SYSTEM AND PAPER-SHEET HANDLING METHOD

CROSS REFERENCE TO RELATED APPLICATIONS

This application claims the benefit of priority from the prior Japanese Patent Application No. 2013-110722 filed on May 27, 2013, the entire contents of which are incorporated herein by reference.

FIELD OF THE INVENTION

The present invention relates to a paper-sheet handling system configured to handle a paper sheet, such as a banknote, a check, a coupon, a form, etc., and a paper-sheet handling method using the paper-sheet handling system.

BACKGROUND ART

There has been conventionally known a paper-sheet handling system configured to handle a paper sheet. As such a paper-sheet handling system, there is known a paper-sheet handling system including a display unit which is configured to display, when an error such as a jam occurs, a location where the error has occurred and/or to display a procedure for cancelling the error that has occurred (see WO2008/044279).

However, the display unit of the conventional paper-sheet handling system as disclosed in WO2008/044279 displays the overall paper-sheet handling system, and thus a location that is actually desired to be displayed, such as a location where an error has occurred, is displayed only at a small scale.

In order to cope with this, it can be considered that the location desired to be displayed is displayed in an enlarged scale. However, when the location desired to be displayed is merely enlarged, there is a possibility that only a part of a paper-sheet handling unit is displayed. In this case, it may be difficult for an operator to intuitively know which paper-sheet handling unit is displayed.

In addition, when there are a number of possible combinations of paper-sheet handling units in a paper-sheet handling system, there is a problem in that image data corresponding to an actual combination is prepared for each time.

The present invention has been made in view of the above circumstances. The object of the present invention is to provide a paper-sheet handling system in which, when information related to a part of a plurality of paper-sheet handling units is/are displayed, it is easy to intuitively know which paper-sheet handling unit/units is/are displayed, among a plurality of the paper-sheet handling units, and a paper-sheet handling method using such a paper-sheet handling system.

DISCLOSURE OF THE INVENTION

A paper-sheet handling system according to the present invention is a paper-sheet handling system including a plurality of paper-sheet handling units each configured to handle a paper sheet, the paper-sheet handling system comprises a display unit configured to display information related to one or more paper-sheet handling unit/units, wherein, when the display unit displays information related to a part of a plurality of the paper-sheet handling units, the display unit displays the information related to the paper-sheet handling unit/units per each unit.

The paper-sheet handling system according to the present invention may further comprise a memory unit configured to store information related to each paper-sheet handling unit as well as components and a layout of the paper-sheet handling units included in the paper-sheet handling system, wherein the display unit may display the information related to the one or more paper-sheet handling unit/units, based on the information related to each paper-sheet handling unit as well as the components and the layout of the paper-sheet handling units included in the paper-sheet handling system.

In the paper-sheet handling system according to the present invention, when the display unit displays a plurality of the paper-sheet handling units, the display unit may display the paper-sheet handling units that are adjacent to each other.

The paper-sheet handling system according to the present invention may further comprise an input unit configured to change a display of the display unit, wherein the display of the display unit may be changed by operating the input unit such that the display unit displays a paper-sheet handling unit which was not being displayed before the input unit was operated and which is adjacent to a paper-sheet handling unit that was being displayed before the input unit was operated.

In the paper-sheet handling system according to the present invention, when no paper-sheet handling unit is adjacent to the paper-sheet handling unit displayed on the display unit, information that the display of the display unit cannot be changed may be notified.

In the paper-sheet handling system according to the present invention, the information related to the paper-sheet handling unit may include basic information showing an external appearance of the paper-sheet handling unit or an inside structure of the paper-sheet handling unit.

In the paper-sheet handling system according to the present invention, the information related to the paper-sheet handling unit may include setting information of the paper-sheet handling unit.

In the paper-sheet handling system according to the present invention, the information related to the paper-sheet handling unit may include information showing an external appearance of the paper-sheet handling unit or information showing an inside structure of the paper-sheet handling unit, and setting information of the paper-sheet handling unit, and when the information showing an external appearance of the paper-sheet handling unit or the information showing an inside structure of the paper-sheet handling unit is selected, the display unit may display the setting information of the paper-sheet handling unit.

A paper-sheet handling method according to the present invention is a paper-sheet handling method using a paper-sheet handling system including a plurality of paper-sheet handling units, the paper-sheet handling method comprises:
handling a paper sheet; and
displaying, on a display unit, information related to one or more paper-sheet handling unit/units;
wherein, when the display unit displays a part of a plurality of the paper-sheet handling units, the display unit displays the paper-sheet handling unit/units per each unit.

Due to the present invention, when the display unit displays information related to a part of a plurality of the paper-sheet handling units, the display unit displays the paper-sheet handling unit/units as per each unit. Thus, when the part of a plurality of the paper-sheet handling units is/are displayed on the display unit, it is easy to intuitively know which paper-sheet handling unit/units is/are displayed, among a plurality of the paper-sheet handling units.

BRIEF DESCRIPTION OF THE DRAWINGS

FIG. 1 is a longitudinal sectional view showing a structure of a banknote handling apparatus according to an embodiment of the present invention.

FIG. 2 is a view showing an example of contents displayed on an operation/display unit of the banknote handling apparatus according to the embodiment of the present invention.

FIG. 3 is a view of contents shown by scrolling rightward an upper left part of a screen of FIG. 2.

FIG. 4 is a view showing another example of contents displayed on the operation/display unit of the banknote handling apparatus according to the embodiment of the present invention.

FIG. 5 is a view showing further another example of contents displayed on the operation/display unit of the banknote handling apparatus according to the embodiment of the present invention.

FIG. 6 is a functional block view of the banknote handling apparatus according to the embodiment of the present invention.

FIG. 7 is a view showing an example of a structure and an arrangement of the banknote handling apparatus used in the embodiment of the present invention.

FIG. 8 is a view showing another example of a structure and an arrangement of the banknote handling apparatus used in the embodiment of the present invention.

FIG. 11 is a view showing the operation/display unit of the banknote handling apparatus according to the embodiment of the present invention, with an external appearance of a banknote handling unit being shown in an enlarged scale.

MODE FOR CARRYING OUT THE INVENTION

Embodiment

Structure

Figure 9:
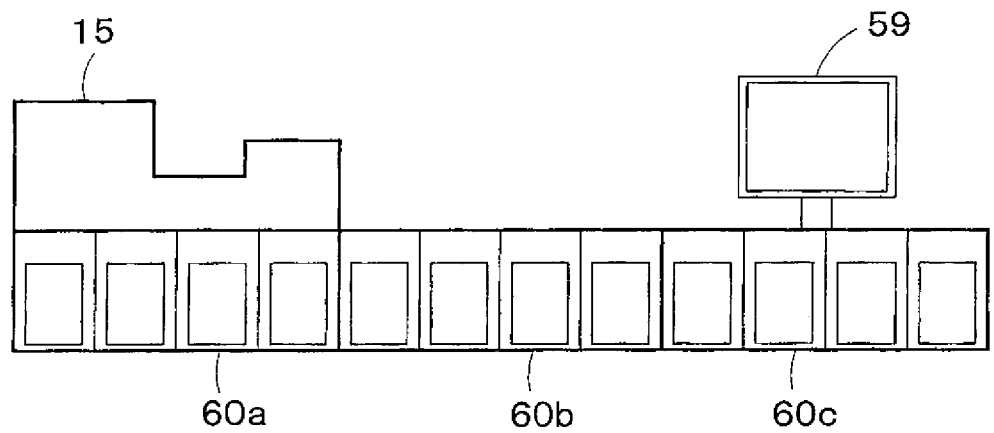
FIG. 9 is a view showing further another example of a structure and an arrangement of the banknote handling apparatus used in the embodiment of the present invention.

An embodiment of a paper-sheet handling system and a paper-sheet handling method according to the present invention will be described herebelow with reference to the drawings.

In this patent application, the term "paper-sheet handling system" is used as a concept including a single "paper-sheet handling apparatus". Thus, the "paper-sheet handling system" recited in the "Claims" means either the paper-sheet handling apparatus 100 itself or a combination of the paper-sheet handling apparatus 100 and another apparatus. Herebelow, there is mainly described an embodiment in which the paper-sheet handling system means the paper sheet handling apparatus 100 itself. In addition, the "paper-sheet" in this patent application means a banknote, a check, a coupon, a form, etc., but typically means a banknote.

As shown in FIG. 1, a paper-sheet handling apparatus 100 in this embodiment includes: a housing 1; a reception unit 11 disposed on the housing 1 and configured to receive a plurality of paper sheets; a taking-in unit 10 configured to take in, one by one, the paper sheets having been received by the reception unit 11; a transport unit 70 configured to transport the respective paper sheets having been taken by the taking-in unit 10 into the housing 1; a recognition and counting unit 55 configured to recognize and count the paper sheets having been transported by the transport unit 70; and a plurality of reject units 65a, 65b configured to reject a paper sheet that has not been stacked in stackers 61a-61d described below. In the recognition process of a banknote, a banknote, the recognition and counting unit 55 recognizes, for example, a denomination, a fitness, a face/back, a version, a direction, an authenticity and so on of the banknote.

In addition, the paper-sheet handling apparatus 100 includes a stacker unit 60 having a plurality of the stackers 61a-61d configured to stack therein paper sheets having been recognized by the recognition and counting unit 55. Each of the stackers 61a-61d has an opened front surface, so that an operator can freely take out the paper sheets in the stackers 61a-61d. A unit including the aforementioned reception unit 11, the taking-in unit 10 and the recognition and counting unit 55 constitute a taking-in and recognition unit 15.

In addition, the paper-sheet handling apparatus 100 in this embodiment includes two paper-sheet bundling units 200 and 300 each of which is configured to bundle paper sheets the number of which is predetermined such as one hundred.

In addition, the paper-sheet handling apparatus 100 in this embodiment includes a paper-sheet reversing unit 90 having paper-sheet reversing parts 91, 95 each of which is configured to reverse a paper sheet. The paper-sheet reversing parts 91, 95 include a short-side reversing part 95 and a long-side reversing part 91. When a paper sheet is transported by the transport unit 70 in a short-side direction, the short-side revering part 95 turns over the transported paper sheet such that an orientation in a short-side direction of the paper sheet is reversed. Meanwhile, the long-side reversing part 91 turns over a paper sheet transported by the transport unit 70 such that an orientation in a long-side direction of the paper sheet is reversed. Since details of a method of reversing a paper sheet by the short-side reversing part 95 and the long-side reversing part 91 are disclosed in WO2010/097954, detailed description thereof is omitted.

In addition, as shown in FIG. 1, the transport unit 70 is provided with a plurality of diverting members 71 each of which is configured to suitably divert a paper sheet transported by the transport unit 70. In addition, the transport unit 70 is provided with a plurality of sensors 72 each of which is configured to detect a paper sheet passing through the transport unit 70 and to detect existence of a paper sheet in the transport unit 70. The sensor 72 disposed on the reception unit 11 is used for judging whether there is a paper sheet or not in the reception unit 11.

The transport unit 70, the diverting members 71 and the sensors 72 are included in each of the taking-in and recognizing unit 15, the paper-sheet reversing unit 90, the stacker unit 60 and the paper-sheet bundling units 200 and 300.

In addition, the paper-sheet bundling units 200 and 300 in this embodiment respectively include a plurality of to-be-bundled paper-sheet stacking units 210a-210c and 310a-310c each of which is configured to stack a plurality of paper sheets having been transported by the transport unit 70, and bundling units 250 and 350 each of which is configured to bundle paper sheets stacked in the to-be-bundled paper-sheet stacking units 210a-210c and 310a-310a with a bundling strip so as to make a paper-sheet bundle.

In addition, the paper-sheet bundling units 200 and 300 respectively include: pre-bundling transport units 220 and 320 configured to transport paper-sheets to be bundled from the to-be-bundled paper-sheet stacking units 210a-210c and 310a-310c to the bundling units 250 and 350; post-bundling transport units 260 and 360 configured to transport a paper-sheet bundle from the bundling units 250 and 350; and paper-sheet-bundle stacking units 270 and 370 configured to accommodate a bundled paper-sheet bundle having been transported by the post-bundling transport units 260 and 360. A paper-sheet bundle accommodated in the paper-sheet-bundle stacking units 270 and 370 can be discharged to bundle discharge openings (not shown) by the paper-sheet-bundle stacking units 270 and 370. Each of the aforementioned bundling units 250 and 350 is configured to bundle paper sheets into a paper-sheet bundle by wrapping one hundred paper sheets, for example, with a bundling strip and fastening the bundling strip.

In addition, as shown in FIG. 1, the paper-sheet bundling units 200 and 300 respectively include fractional return openings 285 and 385 through which a fractional paper-sheet stacked in the to-be-bundled paper-sheet stacking units 210a-210c and 310a-310c is discharged to an operator, when a transaction is finished.

The paper-sheet handling apparatus 100 in this embodiment also includes an operation/display unit 59 formed of a touch panel, for example. The operation/display unit 59 can display predetermined information, and predetermined information can be inputted through the operation/display unit 59. The operation/display unit 59 is configured to display information related to one or more paper-sheet handling unit/units. When the operation/display unit 59 displays information related to a part of the paper-sheet handling unit/units, the operation/display unit 59 is configured to display information related to the paper-sheet handling unit/units of interest per each unit. In addition, by pressing a button or the like displayed on a screen, the display in the operation/display unit 59 can be changed. As described above, in this embodiment, the operation/display unit 59 functions are the "display unit" and the "input unit" recited in "Claims". "To display . . . per each unit" means that the "paper-sheet handling unit/units" is/are entirely displayed, instead of being partially displayed.

In this embodiment, the "paper-sheet handling unit" is a unit that can be optionally combined with the paper-sheet handling apparatus and installed therein. In the embodiment shown in FIG. 1, the "paper-sheet handling unit" means the taking-in and recognition unit 15, the paper-sheet reversing unit 90, the stacker unit 60 and the paper-sheet bundling units 200 and 300, respectively.

When the operation/display unit 59 displays a plurality of the paper-sheet handling units, the operation/display unit 59 in this embodiment is configured to display the paper-sheet handling units that are adjacent to each other. Namely, when two paper-sheet handling units are displayed, the two paper-sheet handling units which are not adjacent to each other are not simultaneously displayed. When there are displayed three or more paper-sheet handling units including two paper-sheet handling units that are not adjacent to each other, a paper-sheet handling unit, which is interposed between the two paper-sheet handling units that are not adjacent to each other, is simultaneously displayed. For example, the operation/display unit 59 simultaneously displays the taking-in and recognition unit 15, the paper-sheet reversing unit 90, the stacker unit 60 and the paper-sheet bundling unit 200 (see upper left part of FIG. 2). By scrolling the screen, the operation/display unit 59 simultaneously displays the two paper-sheet bundling units 200 and 300 (see upper left part of FIG. 3)

Not limited to such an embodiment, the operation/display unit 59 in this embodiment may simultaneously display the paper-sheet handling units that are not adjacent to each other. According to this embodiment, when errors occur simultaneously in paper-sheet handling units that are not adjacent to each other, a plurality of the paper-sheet handling units in which the errors have occurred can be simultaneously displayed. This manner of display is advantageous in that only the paper-sheet handling units desired to be displayed can be displayed collectively.

The display of the operation/display unit 59 is changed such that, by operating the operation/display unit 59, the operation/display unit 59 displays a paper-sheet handling unit which was not being displayed before the operation/display unit 59 was operated and which is adjacent to the paper-sheet handling unit that was being displayed before the operation/display unit 59 was operated. This point is explained by giving an example. For example, when the taking-in and recognition unit 15, the paper-sheet reversing unit 90, the stacker unit 60 and the paper-sheet bundling unit 200 are displayed while the paper-sheet bundling unit 300 is not displayed, by, e.g., pressing the button displayed on the screen of the operation/display unit 59 so as to operate the operation/display unit 59, the paper-sheet bundling unit 300 is displayed instead of the taking-in and recognition unit 15, the paper-sheet reversing unit 90 and the stacker unit 60. As a result, the two paper-sheet bundling units 200 and 300 are displayed on the operation/display unit 59.

In addition, in this embodiment, when no paper-sheet handling unit is adjacent to the paper-sheet handling unit displayed on the operation/display unit 59, information that the display of the operation/display unit 59 cannot be changed is notified. This point is explained by giving an example. Suppose that the taking-in and recognition unit 15, the paper-sheet reversing unit 90, the stacker unit 60 and the paper-sheet bundling unit 200 are displayed. In this case, since no paper-sheet handling unit exists on the left side of the paper-sheet reversing unit 90, a button for scrolling the screen leftward is not displayed or displayed vaguely on the screen of the operation/display unit 59. Similarly, suppose that the two paper-sheet bundling units 200 and 300 are displayed. In this case, since no paper-sheet handling unit exists on the right side of the paper-sheet bundling unit 300, a button for scrolling the screen rightward is not displayed or displayed vaguely on the screen of the operation/display unit 59. In the display of the upper left part of FIG. 2, a triangle facing the left side is depicted by "dotted lines", which means that the screen cannot be scrolled any more. Similarly, in the display of the upper left part of FIG. 3, a triangle facing the right side is depicted by "dotted lines", which means that the screen cannot be scrolled any more. On the other hand, in the display of the upper left part of FIG. 2, a triangle facing the right side is depicted by a "solid line", which means that the screen can be scrolled. Similarly, in the display of the upper left part of FIG. 3, a triangle facing the left side is depicted by a "solid line", which means that the screen can be scrolled.

The operation/display unit 59 may display information related to a location where an error has occurred. As shown in the upper left part of FIGS. 2 and 3, for example, the location with error has occurred may be displayed emphatically by lighting, blinking, coloring, etc. (in FIGS. 2 and 3, the paper-sheet bundling unit 200 with error is depicted by a "bold line"). In addition, as shown in the lower left parts of FIGS. 2 and 3, information related to the error is shown by characters. In addition, as shown in the right side parts of FIGS. 2 and 3, the operation/display unit 59 may display a video for showing an error releasing method.

Figure 4:
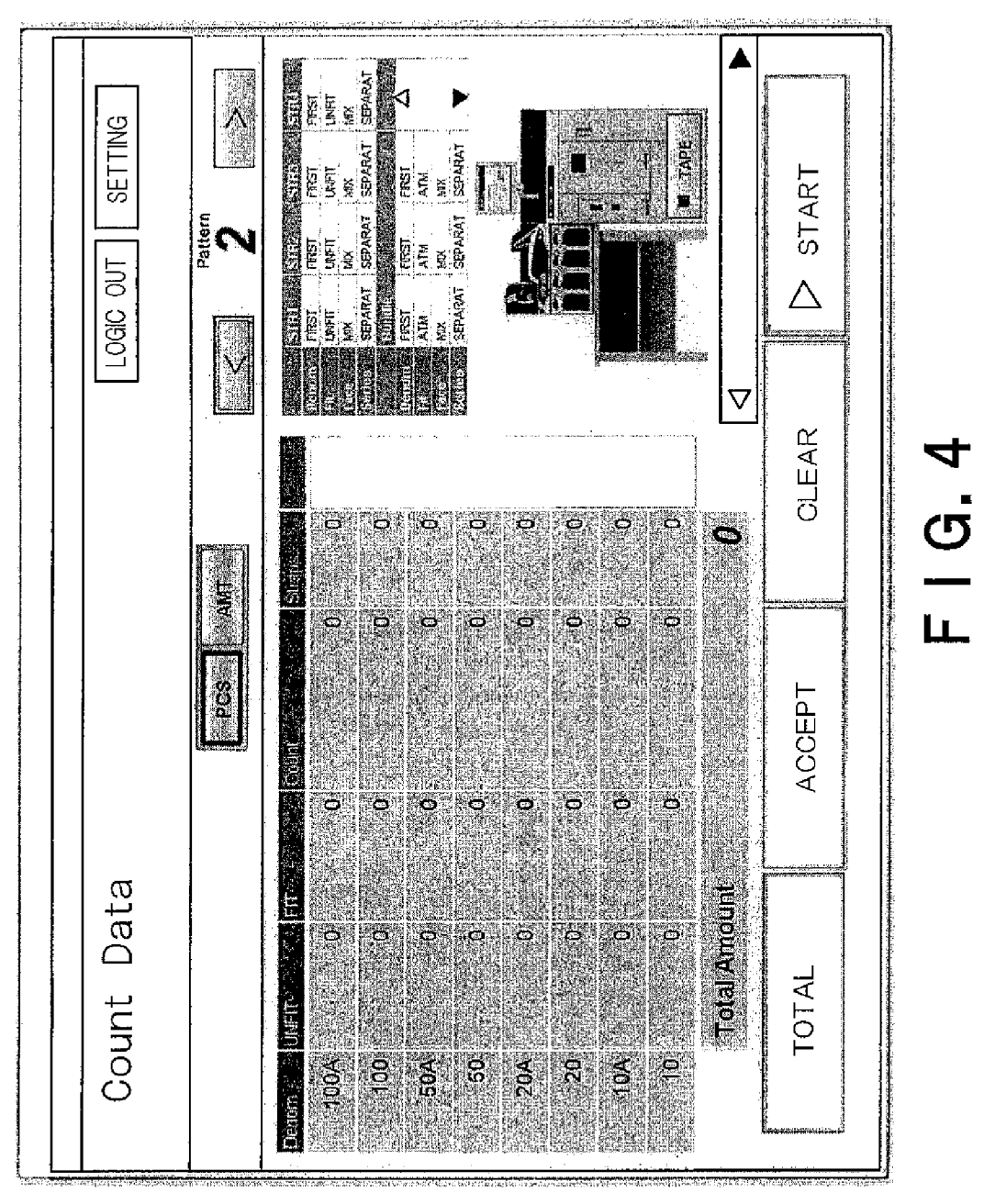

The "information related to a paper-sheet handling unit" in this embodiment may include information showing an inside structure of a paper-sheet handling unit, which is shown in FIG. 1, in addition to the information showing an external appearance of a paper-sheet handling unit, which is shown in FIGS. 2 and 3. In addition, the "information related to a paper-sheet handling unit" may include a count result by the paper-sheet handling unit, which is shown in the left side part of FIG. 4, and setting information such as a stacker pattern or the like of the paper-sheet handling unit, which is shown in the upper right part of FIG. 4 and FIG. 5. In addition, it is not necessary that the "information related to a paper-sheet handling unit" includes information related to an external appearance of a paper-sheet handling unit, which is shown in FIGS. 2 and 3. The "information related to a paper-sheet handling unit" may include one or more of information showing an inside structure of a paper-sheet handling unit, which is shown in FIG. 1, a count result by the paper-sheet handling unit, which is shown in the left side part of FIG. 4, and setting information such as a stacker pattern or the like of the paper-sheet handling unit, which is shown in the upper right part of FIG. 4 and FIG. 5.

FIG. 4 shows that "PCS" displayed on an upper central part of FIG. 4 is selected. In this mode, the number of unfit note(s), the number of fit note(s), the total amount number, and the number of bundle(s) are displayed for each denomination. In FIG. 4, the number of unfit note(s) is displayed on an "UNFIT" column, the number of fit note(s) is displayed on a "FIT" column, the total amount number is displayed on a "COUNT" column, and the number of bundle(s) is displayed on a "Straps" column. When "AMT" of FIG. 4 is selected, a total amount sum is displayed. In FIG. 4, "A" means an old version note, and "" without the character A means a new version note. In FIG. 4, "START" is a button for starting a recognizing and counting process. In FIG. 4, "ACCEPT" is a button for accepting a transaction. In FIG. 4, "TOTAL" is a button for displaying all of the accepted transaction contents. In FIG. 4, "CLEAR" is a button for deleting a count result shown on the operation/display unit 59.

When "SETTING" displayed on the upper right part of FIG. 4 is selected, the screen is changed to a setting screen on which a setting of paper sheets to be stacked in the stackers 61a-61d and so on can be changed. In addition, setting information such as a stacker pattern or the like is displayed on the upper right part of the operation/display unit 59. To be specific, in FIG. 4, a stacker pattern of "Pattern 2" is displayed. A storage unit 56, which is described below, stores setting information such as a plurality of stacker patterns and so on. In the embodiment shown in FIG. 4, by pressing buttons displayed on both sides of "Pattern 2", different stacker patterns can be sequentially displayed on the operation/display unit 59.

In addition, the screen can be scrolled by pressing triangular buttons ("Δ", "▲") displayed on the operation/display unit 59. More specifically, by pressing the upward or downward triangular button displayed adjacently to the stacker pattern, setting information of another paper-sheet handling unit, which is not displayed at present, can be displayed. In the embodiment shown in FIG. 4, by pressing the downward triangular button, a stacker pattern of the banknote bundling unit 300 can be displayed. In addition, by pressing the rightward or leftward triangular button shown in the lower right part of FIG. 4 where the external appearance of the paper-sheet handling unit is shown, an external appearance of another paper-sheet handling unit, which is not displayed at present, can be displayed. In the embodiment shown in FIG. 4, by pressing the rightward triangular button, an external appearance of the paper-sheet bundling unit 300 can be displayed. In FIG. 4, the blank triangle ("Δ") means that there is no information related to an adjacent paper-sheet handling unit and thus such information cannot be displayed, and the black triangle ("▲") means that information related to an adjacent paper-sheet handling unit can be displayed. In addition, the setting information and the external appearance (the "external appearance" is one example of the below-described "basic information") related to the same paper-sheet handling unit may be displayed. In order to achieve such a display, when one of the display of the setting information and the external appearance (basic information) is scrolled, the other display is automatically scrolled in conjunction therewith.

In this embodiment, the "button" is used for scrolling the display of the screen, which is only as an example. Namely, it is sufficient that a "changing unit" for changing a display of the operation/display unit 59 exists. The "button" explained in this embodiment is nothing more than one example of the changing unit.

When the operation/display unit 59 displays information showing an external appearance of a paper-sheet handling unit and information showing an inside of a paper-sheet handling unit are displayed, the operation/display unit 59 may emphatically display a location which requires some care by an operator, such as a location where an error has occurred, a location where a cover of the housing is opened, a location where a paper sheet remains after an acceptance process and so on, by lighting, blinking, coloring, etc.

In this embodiment, for example, information related to a paper-sheet handling unit includes information showing an external appearance of the paper-sheet handling unit, and setting information of a paper-sheet handling unit. In this embodiment, when an operator selects the information showing an external appearance of a paper-sheet handling unit, which is shown in the upper left parts of FIGS. 2 and 3, through the operation/display unit 59, the operation/display unit 59 may display, in an enlarged scale, setting information of the selected paper-sheet handling unit, which is shown in the upper right parts of FIG. 4 and FIG. 5.

The example is explained with reference to the embodiment shown in FIG. 5. When an operator selects the paper-sheet bundling unit 200 in the information showing an external appearance of a paper-sheet handling unit, which is shown in upper left of FIGS. 2 and 3, setting information of the selected paper-sheet bundling unit 200 is displayed as shown in FIG. 5. In FIG. 5, the "paper-sheet bundling unit A" corresponds to the paper-sheet bundling unit 200. The uppermost setting information is related to the to-be-bundled paper-sheet stacking unit 210a, the middle setting information is related to the to-be-bundled paper-sheet stacking unit 210b, and the lowermost setting information is related to the to-be-bundled paper-sheet stacking unit 210c.

In the embodiment in which information related to a paper-sheet handling unit includes information showing an inside structure of the paper-sheet handling unit and setting information of the paper-sheet handling unit, when an operator selects information showing an inside structure of the paper-sheet handling unit, setting information of the selected paper-sheet handling unit may be displayed on the operation/display unit 59.

As shown in FIG. 6, the paper-sheet handling apparatus 100 also comprises the memory unit 56 configured to store various information. The memory unit 56 stores information related to each paper-sheet handling unit as well as components and a layout of the paper-sheet handling units included in the paper-sheet handling system. As the information related to each paper-sheet handling units, basic information showing an external appearance of each paper-sheet handling unit or an inside structure of each paper-sheet handling unit can be taken as an example. Based on the basic information of each paper-sheet handling unit as well as the components and the layout of the paper-sheet handling units included in the paper-sheet handling system, which are stored in the memory unit 56, the operation/display unit 59 is configured to display information related to a paper-sheet handling unit. The memory unit 56 in this embodiment stores basic information of the operation/display unit 59, and the position of the operation/display unit 59.

This point is explained with reference to the embodiment shown in FIG. 1. The memory unit 56 stores information that the taking-in and recognition unit 15, the paper-sheet reversing unit 90, the stacker unit 60, the paper-sheet bundling unit 200 and the paper-sheet bundling unit 300 are included in the paper-sheet handling system, information that the paper-sheet reversing unit 90, the stacker unit 60, the paper-sheet bundling unit 200 and the paper-sheet bundling unit 300 are arranged in this order from the left side, and information that the taking-in and recognition unit 15 is arranged above the stacker unit 60. In addition, the memory unit 56 stores the basic information of each of the taking-in and recognition unit 15, the paper-sheet reversing unit 90, the stacker unit 60 and the paper-sheet bundling units 200 and 300.

Based on the information related to the components and the layout of the paper-sheet handling units, the operation/display unit 59 is configured to read out the basic information of the taking-in and recognition unit 15, the paper-sheet reversing unit 90, the stacker unit 60 and the paper-sheet bundling units 200 and 300, and thus to display the information related to a paper-sheet handling unit.

In this embodiment, as shown in FIG. 6, connected to the control unit 50 are the taking-in unit 10, the transport unit 70, the long-side reversing part 91, the short-side reversing part 95, the bundling units 250 and 350, the pre-bundling transport units 220 and 320, the post-bundling transport units 260 and 360, the stackers 61a-61d, the reject units 65a and 65b, the memory unit 56, the recognition and counting unit 55, the operation/display unit 59, the diverting members 71, the sensors 72 and so on. The control unit 50 controls them and obtains information therefrom.

Figure 10:
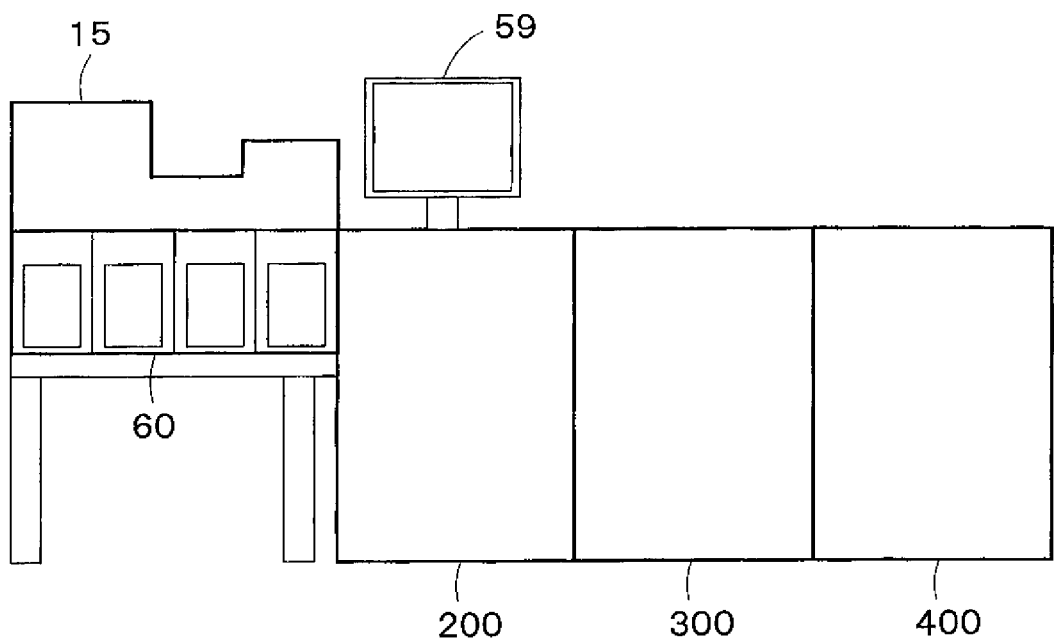
FIG. 10 is a view showing further another example of a structure and an arrangement of the banknote handling apparatus used in the embodiment of the present invention.

Although the present invention has been explained by using the paper-sheet handling system including the taking-in and recognition unit 15, the paper-sheet reversing unit 90, the stacker unit 60, the paper-sheet bundling unit 200 and the paper-sheet bundling unit 300, the embodiment of the paper-sheet handling system is not limited thereto as a matter of course. As has been already described, since the "paper-sheet handling unit" is a unit that can be optionally combined with the paper sheet handling apparatus and installed therein, various combinations can be considered. For example, there can be considered an embodiment in which the taking-in and recognition unit 15, the two stackers units 60a and 60b, and the one paper-sheet bundling unit 200 are included, which is shown in FIG. 7, an embodiment in which the taking-in and recognition unit 15, the two stacker units 60a and 60b, and the two paper-sheet bundling units 200 and 300 are included, which is shown in FIG. 8, an embodiment in which the taking-in and recognition unit 15 and the three stacker units 60a, 60b and 60c are included, which is shown in FIG. 9, and an embodiment in which the taking-in and recognition unit 15, the one stacker unit 60, and the three paper-sheet bundling units 200, 300 and 400 are included, which is shown in FIG. 10.

In addition, for example, as in the embodiment shown in FIG. 8, when the paper-sheet handling apparatus 100 has a relatively larger length, the operation/display unit 59 may simultaneously display the taking-in and recognition unit 15, the two stacker units 60a and 60b, and the paper-sheet bundling unit 200. By scrolling the screen, the operation/display unit 59 may simultaneously display the stacker unit 60b and the two paper-sheet bundling units 200 and 300. Similarly, in the embodiment shown in FIG. 10, the operation/display unit 59 may simultaneously display the taking-in and recognition unit 15, the stacker unit 60b, and the two paper-sheet bundling units 200 and 300. By scrolling the screen, the operation/display unit 59 may simultaneously display the three paper-sheet bundling units 200, 300 and 400.

Although the present invention has been described by mainly using the embodiment in which the paper-sheet handling system means the paper-sheet handling apparatus 100 itself, the present invention is not limited thereto. For example, the operation/display unit (input unit, display unit) and/or the memory unit may be separated from the paper-sheet handling apparatus 100. Alternatively, one or both of the operation/display unit (input unit, display unit) and the memory unit may be provided on a management apparatus that is located apart from the paper-sheet handling apparatus 100 and manages the paper-sheet handling apparatus 100, for example. As described above, these modification examples are based on the fact that the "paper-sheet handling system" recited in "Claims" may mean either the paper-sheet handling apparatus 100 itself or a combination of the paper-sheet handling apparatus 100 and another apparatus.

Method

Next, a paper-sheet handling method using the aforementioned paper-sheet handling apparatus 100 is briefly described.

A plurality of paper-sheets are placed in the reception unit 11 and the paper-sheets are taken, one by one, by the taking-in unit 10 into the housing 1, so that a paper-sheet handling process, such as a depositing process, a dispensing process or the like, is performed. The paper sheets having been taken into the housing 1 are transported by the transport unit 70, and are recognized and counted by the recognition and counting unit 55. Thereafter, the paper sheets are stored into the storing units such as the stackers 61a-61d, the to-be-bundled paper-sheet stacking units 210a-210c and 310a-310c and so on.

For example, when an error occurs during the handling process of the paper sheets, information related to a paper-sheet handling unit in which the error has occurred is displayed on the operation/display unit 59. Then, when a part of a plurality of the paper-sheet handling units are displayed on the operation/display unit 59, a plurality of the paper-sheet handling units, including the paper-sheet handling unit in which the error has occurred, are displayed per each unit.

The point is explained with reference to an embodiment shown in FIG. 11(a). In FIG. 11(a), an error has occurred in the paper-sheet bundling unit 300, and the two paper-sheet bundling units 200 and 300 are displayed. As shown in FIG. 11(a), the paper-sheet bundling unit 300 in which the error has occurred is displayed in an enlarged scale, and is emphatically displayed by blinking. Displayed on the operation/display unit 59 are the paper-sheet bundling unit 300 and the paper-sheet bundling unit 200 adjacent thereto. The screen displayed on the operation/display unit 59 can be scrolled. Namely, by pressing the triangular button facing leftward, which is displayed on the operation/display unit 59, the taking-in and recognition unit 15, the paper-sheet reversing unit 90, the stacker unit 60 and the paper-sheet bundling unit 200 are displayed as shown in FIG. 11(b). In FIGS. 11(a) and 11(b), the external appearances of the paper-sheet handling units are displayed in an enlarged scale. However, the external appearances of the paper-sheet handling units may be displayed in the manner as shown in FIGS. 2 and 3.

When errors occur in a plurality of the paper-sheet handling units, a paper-sheet handling unit located on a downstream side in a paper-sheet transport direction may be preferentially displayed, for example. In the embodiment shown in FIG. 1, the descending order of priority is the paper-she bundling unit 300>the paper-sheet bundling unit 200>the stacker unit 60>the paper-sheet reversing unit 90>the taking-in ad recognition unit 15. As an alternative example, the paper-sheet handling units may be sequentially displayed in the order that is preferred in releasing errors. This case is advantageous in that an operator can naturally carry out an error releasing process to the paper-sheet handling units in the order preferred in releasing errors.

Operation/Effect

Next, an operation/effect of this embodiment as structured above is explained.

According to this embodiment, when the operation/display unit 59 displays information related to a part of a plurality of the paper-sheet handling unit/units, the operation/display unit 59 displays the paper-sheet handling unit/units per each unit. Thus, when the part of a plurality of the paper-sheet handling units is/are displayed on the display unit, it is easy for an operator to intuitively know which paper-sheet handling unit/units of a plurality of the paper-sheet handling units is/are displayed.

This point is explained.

The display unit of the conventional paper-sheet handling system as disclosed in WO2008/044279 displays the overall paper-sheet handling system, and a location that is actually desired to be displayed, such as a location where an error has occurred, is displayed only at a small scale (see (A1), (C1) and (C2) in FIG. 4 of WO2008/044279). Thus, an operator cannot know in detail where an error has occurred and what the error is like, for example. In order to cope with this, it can be considered that the location desired to be displayed is displayed in an enlarged scale. However, when the location desired to be displayed is merely enlarged, there is a possibility that only a part of a paper-sheet handling unit is displayed. In this case, it may be difficult for an operator to intuitively know which paper-sheet handling unit is displayed.

On the other hand, according to this embodiment, when the operation/display unit 59 displays information related to a part of a plurality of the paper-sheet handling unit/units, the operation/display unit 59 is configured to display the paper-sheet handling unit/units per each unit. Thus, there is no possibility that the paper-sheet handling unit/units is/are partially displayed; and since an overall external appearance/appearances and an inside structure/structures of a paper-sheet handling unit/units are displayed, it is easy for an operator to intuitively know which paper-sheet handling unit/units is/are displayed, even when the paper-sheet handling unit/units is/are displayed in an enlarged scale (see upper left part of FIGS. 2 and 3, lower right part of FIG. 4, and FIGS. 11(a) and 11(b)).

In addition, when an image is merely displayed in an enlarged scale, there is displayed a location that is irrelevant to a location actually desired to be displayed, such as a location where an error has occurred. It is meaningless to display such an irrelevant location in an enlarged scale. On the other hand, according to this embodiment, only the paper-sheet handling unit that is desired to be enlarged can be displayed, and further a location desired to be enlarged can be displayed in a more enlarged manner.

In addition, in this embodiment, when a plurality of the paper-sheet handling units are displayed, the paper-sheet handling units that are adjacent to each other are displayed (see upper left parts of FIGS. 2 and 3, lower right part of FIG. 4 and FIGS. 11(a) and 11(b)). Thus, the actual layout of the paper-sheet handling units and the layout of the paper-sheet handling units displayed on the operation/display unit 59 can be associated with each other, whereby an operator can easily know the location where an error has occurred, for example.

In addition, in this embodiment, by operating the operation/display unit 59, the operation/display unit 59 displays a paper-sheet handling unit which was not being displayed before the operation/display unit 59 was operated and which is adjacent to the paper-sheet handling unit that was being displayed before the operation/display unit 59 was operated (see upper left parts of FIGS. 2 and 3 and FIGS. 11(a) and 11(b)). As a result, since an operator can scroll the screen in accordance with the actual layout of the paper-sheet handling units, the operator can easily know which paper-sheet handling unit information he/she looks at now.

In addition, in this embodiment, when no paper-sheet handling unit is adjacent to the paper-sheet handling unit displayed on the operation/display unit 59, information that the display of the operation/display unit 59 cannot be changed is notified (see upper left parts of FIGS. 2 and 3 and FIGS. 11(a) and 11(b)). Thus, an operator can previously know that the screen cannot be scrolled any more.

In addition, when the "information related to a paper-sheet handling unit" includes information showing an external appearance (see upper left parts of FIGS. 2 and 3 and FIGS. 11(a) and 11(b)), since the actual external appearance and the contents displayed on the operation/display unit 59 conform to each other, an operator can easily know at which location an error has occurred, for example.

In addition, when the "information related to a paper-sheet handling unit" includes information showing an inside structure of a paper-sheet handling unit (see FIG. 1), it can be easily confirmed, through the operation/display unit 59, at which location in the inside structure of the paper-sheet handling unit an error has occurred, for example. Thus, it is easy to a repair the error at an earlier timing. Although FIG. 1 shows the detailed structure, when the "information related to paper-sheet handling unit" includes information showing an inside structure of a paper-sheet handling unit, a more simplified figure may be used.

In addition, when the "information related to a paper-sheet handling unit" includes setting information of a paper-sheet handling unit (see upper right part of FIG. 4 and FIG. 5), an operator can easily know a setting of the paper-sheet handling unit.

Suppose an aspect in which the "information related to a paper-sheet handling unit" includes information showing an external appearance of a paper-sheet handling unit or information showing an inside structure of a paper-sheet handling unit, and setting information of a paper-sheet handling unit; and when an operator selects the information showing an external appearance of a paper-sheet handling unit or the information showing an inside structure of a paper-sheet handling unit, the operation/display unit 59 is configured to display the setting information of a selected paper-sheet handling unit. When this aspect is adopted, the operator can confirm the setting information of the selected paper-sheet handling unit, only by selecting the information showing an external appearance of the paper-sheet handling unit or the information showing an inside structure of the paper-sheet handling unit. Since the information showing an external appearance of the paper-sheet handling unit or an inside structure of the paper-sheet handling unit conforms to the actual layout condition of the paper-sheet handling unit, the operator can easily know which paper-sheet handling unit setting information he/she looks at now.

In addition, in this embodiment, the memory unit 56 is configured to store basic information of each paper-sheet handling unit as well as components and a layout of the paper-sheet handling units included in the paper-sheet handling system. Based on the basic information of each paper-sheet handling unit as well as the components and the layout of the paper-sheet handling units included in the paper-sheet handling system, which are stored in the memory unit 56, the operation/display unit 59 is configured to display the information related to a paper-sheet handling unit. Thus, according to this embodiment, even when a structure (combination) and/or a layout of the paper-sheet handling units is/are changed, it is not necessary to prepare new image data, whereby a free plan of a client can be achieved with low costs.

That is to say, in this embodiment, the memory unit 56 stores basic information of each paper-sheet handling unit. Information related to actual components and an actual layout of the paper-sheet handling units is inputted through, e.g., the operation/display unit 59, and is stored in the memory unit 56. Then, the operation/display unit 59 reads out the basic information of each paper-sheet handling unit from the information related to the actual components and the actual layout of the paper-sheet handling units, and displays the information related to a paper-sheet handling unit. Namely, in this embodiment, since a paper-sheet handling unit is displayed per each unit on the operation/display unit 59, it is sufficient that only the basic information of each paper-sheet handling unit is previously stored in the memory unit 56. Only by inputting the information related to components and a layout of the paper-sheet handling units through, e.g., the operation/display unit 59 in accordance with an actual used condition, the basic information stored in the memory unit 56 is suitably read out so as to be displayed on the operation/display unit 59. Therefore, since it is not necessary to previously prepare an image in accordance with actual components (combination) and an actual layout of the paper-sheet handling system, a maker can satisfy a free plan of a user, without any trouble or cost.

The above description of the embodiment and the disclosure of the drawings are mere examples for explaining the invention recited in the claims. The invention recited in the claims will not be limited by the above description of the embodiment and the disclosure of the drawings.

15 Taking-in and recognition unit
50 Control unit
56 Memory unit
59 operation/display unit (display unit, input unit)
60 Stacker unit
90 Paper-sheet reversing unit
100 Paper-sheet handling apparatus
200 Paper-sheet bundling unit
300 Paper-sheet bundling unit
400 Paper-sheet bundling unit

The invention claimed is:

1. A paper-sheet handling system including a plurality of paper-sheet handling units each configured to handle a paper sheet,
    the paper-sheet handling system comprising a display unit configured to display information related to one or more paper-sheet handling unit/units,
    wherein, when the display unit displays information related to a part of a plurality of the paper-sheet handling units, the display unit displays the information related to the paper-sheet handling unit/units per each unit,
    wherein the display unit is configured to change the display such that the display unit displays a paper-sheet handling unit which was not being displayed and which is adjacent to a paper-sheet handling unit that was being displayed, and
    wherein when no paper-sheet handling unit is adjacent to the paper-sheet handling unit displayed on the display unit, information that the display of the display unit cannot be changed is notified.

2. The paper-sheet handling system according to claim 1, further comprising a memory unit configured to store information related to each paper-sheet handling unit as well as components and a layout of the paper-sheet handling units included in the paper-sheet handling system,
    wherein the display unit displays the information related to the one or more paper-sheet handling unit/units, based on the information related to each paper-sheet handling unit as well as the components and the layout of the paper-sheet handling units included in the paper-sheet handling system.

3. The paper-sheet handling system according to claim 1, wherein
    when the display unit displays a plurality of the paper-sheet handling units, the display unit displays the paper-sheet handling units that are adjacent to each other.

4. The paper-sheet handling system according to claim 1, further comprising an input unit configured to change a display of the display unit,
    wherein the display of the display unit is changed by operating the input unit such that the display unit displays a paper-sheet handling unit which was not being displayed before the input unit was operated and which is adjacent to a paper-sheet handling unit that was being displayed before the input unit was operated.

5. The paper-sheet handling system according to claim 1, wherein
    the information related to the paper-sheet handling unit includes basic information showing an external appearance of the paper-sheet handling unit or an inside structure of the paper-sheet handling unit.

6. The paper-sheet handling system according to claim 1, wherein the information related to the paper-sheet handling unit includes setting information of the paper-sheet handling unit.

7. A paper-sheet handling method using a paper-sheet handling system including a plurality of paper-sheet handling units, the paper-sheet handling method comprising:
handling a paper sheet; and
displaying, on a display unit, information related to one or more paper-sheet handling unit/units;
wherein, when the display unit displays a part of a plurality of the paper-sheet handling units, the display unit displays the paper-sheet handling unit/units per each unit,
wherein the display unit is configured to change the display such that the display unit displays a paper-sheet handling unit which was not being displayed and which is adjacent to a paper-sheet handling unit that was being displayed, and
wherein when no paper-sheet handling unit is adjacent to the paper-sheet handling unit displayed on the display unit, information that the display of the display unit cannot be changed is notified.

\* \* \* \* \*